3 Sheets--Sheet 1.

J. EASTERLY.

Base-Burning Stoves.

No. 5,498. Reissued July 22, 1873.

Witnesses.

J. A. Campbell.

Wm. S. Anderson

Inventor.

James Easterly by

Mason, Fenwick & Lawrence

N. PETERS, PHOTO-LITHOGRAPHER, WASHINGTON, D. C.

3 Sheets--Sheet 2.
J. EASTERLY.
Base-Burning Stoves.
No. 5,498. Reissued July 22, 1873.
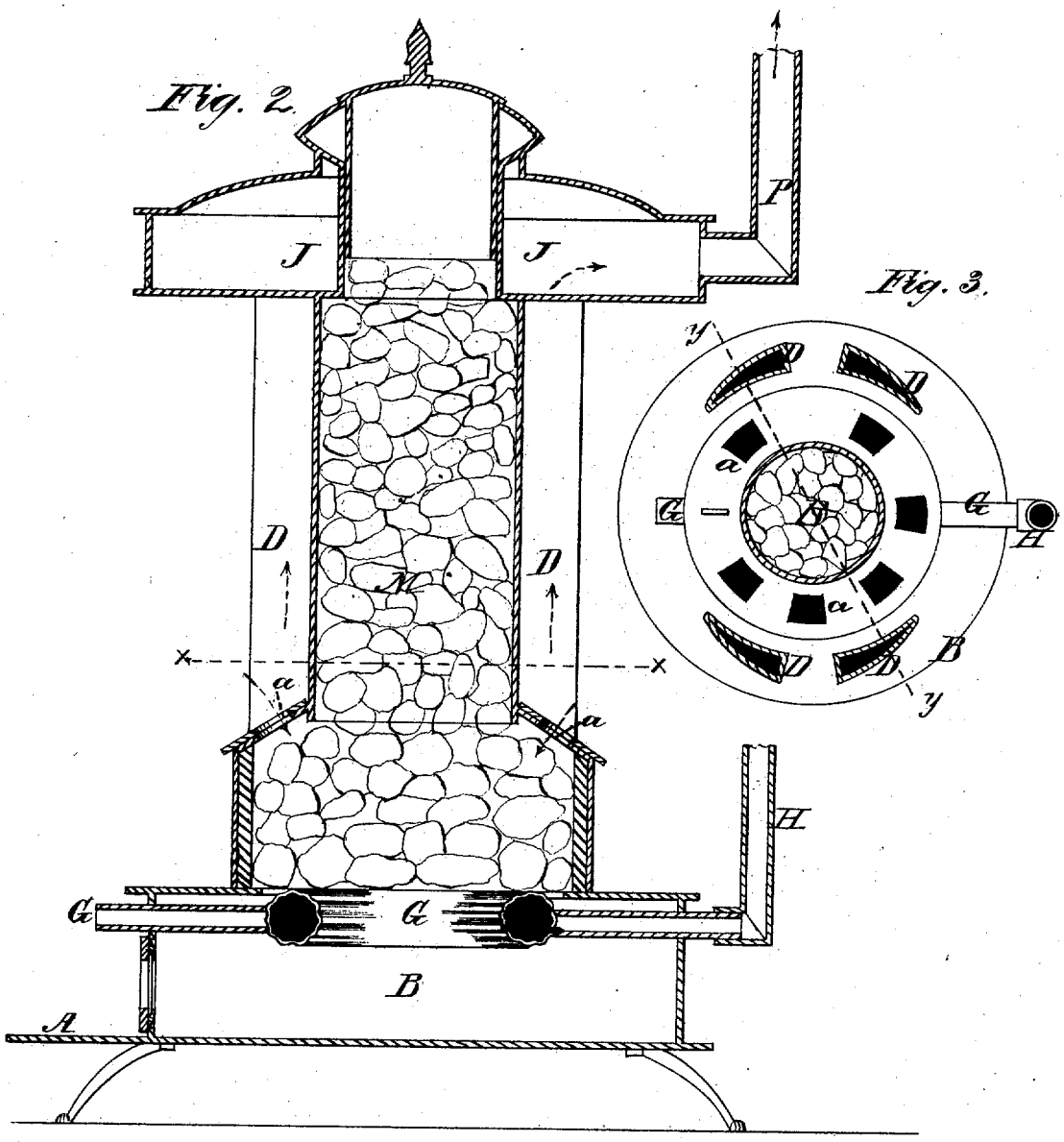
Witnesses.
J. N. Campbell
Wm. Henderson
Inventor.
James Easterly
by
Mann, Brown & Lawrence
N. PETERS, PHOTO-LITHOGRAPHER, WASHINGTON, D. C.

J. EASTERLY.

Base-Burning Stoves.

No. 5,498.

Reissued July 22, 1873.

Witnesses
G. N. Campbell
R. T. Campbell

Inventor
James Easterly
by
Mason Fenwick & Lawrence
Atty.

N. PETERS, PHOTO-LITHOGRAPHER, WASHINGTON, D. C.

UNITED STATES PATENT OFFICE.

JAMES EASTERLY, OF ALBANY, NEW YORK, ASSIGNOR TO JOHN S. PERRY, TRUSTEE AND EXECUTOR OF MARY PERRY, DECEASED, AND NATHAN B. PERRY.

IMPROVEMENT IN BASE-BURNING STOVES.

Specification forming part of Letters Patent No. 12,382, dated February 13, 1855; reissue No. 3,009, dated June 30, 1868; extended seven years; reissue No. 5,498, dated July 22, 1873; application filed February 13, 1873.

*To all whom it may concern:*

Be it known that I, JAMES EASTERLY, of Albany, in the county of Albany and State of New York, have invented an Improved Stove; and I do hereby declare that the following is a full, clear, and exact description thereof, reference being had to the accompanying drawings making part of this specification, in which—

Figure 1:
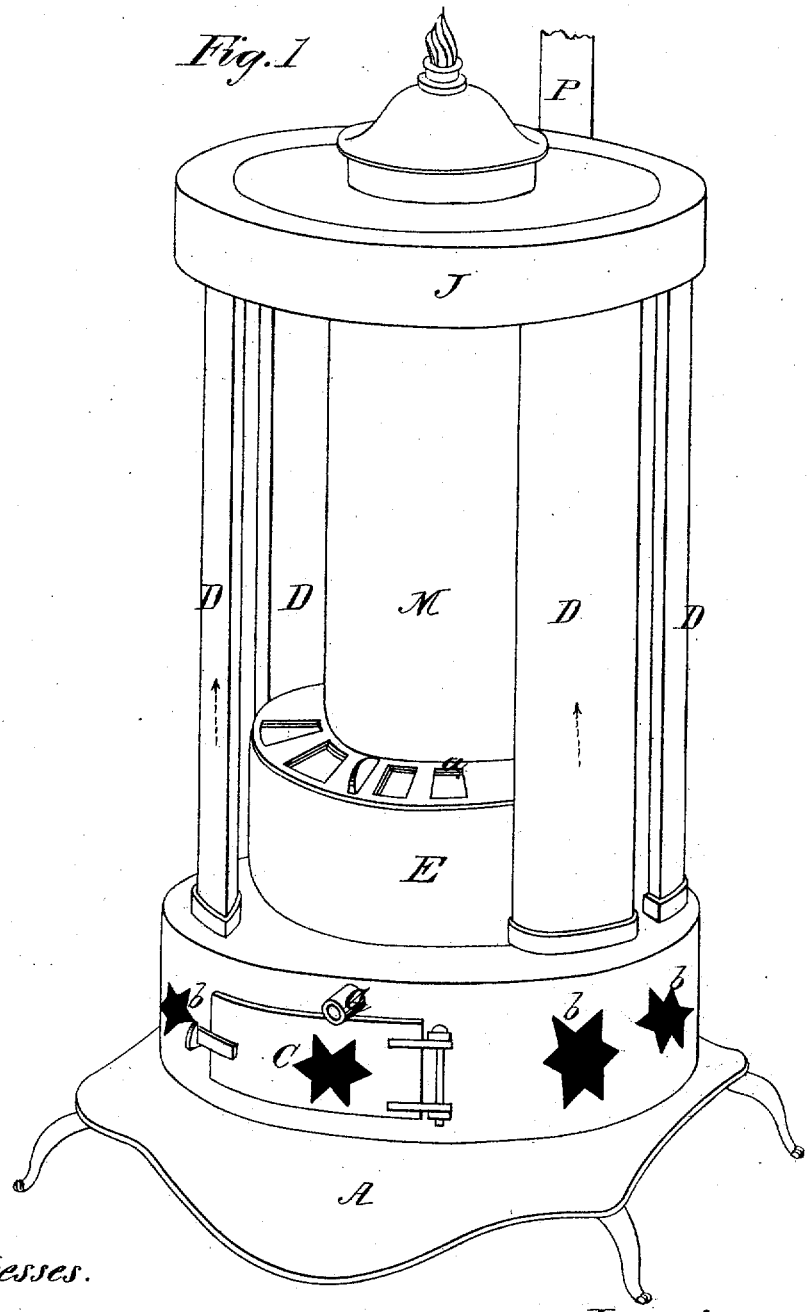
Figure 4:
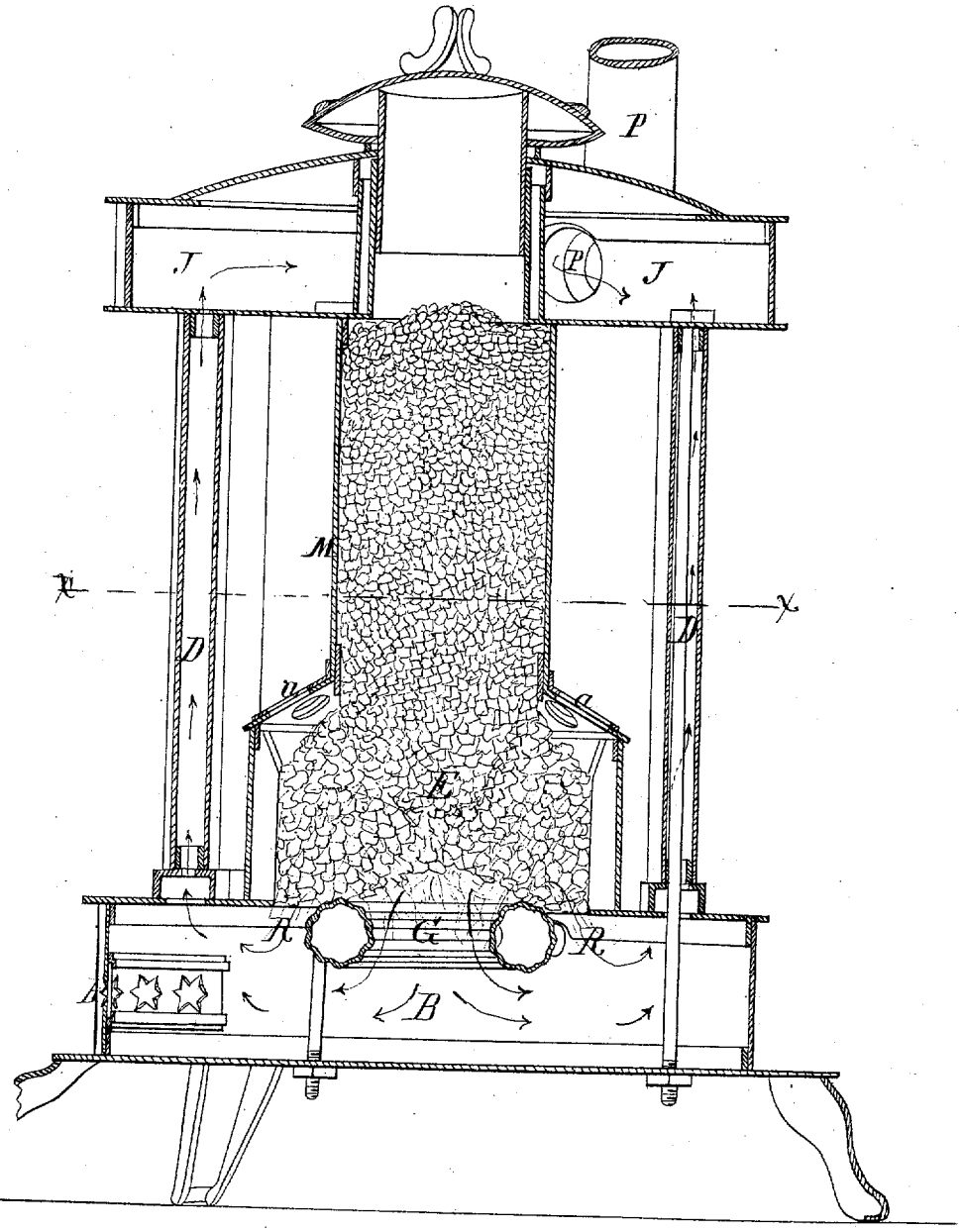

Figure 1 is a perspective view of the stove, showing clearly the illuminating section. Fig. 2 is a vertical section through the center of the stove. Fig. 3 is a section taken through the stove above the illuminating section, in the plane indicated by dotted line *x x*, Fig. 2. Fig. 4 is a section through dotted line *y y*.

Similar letters of reference indicate corresponding parts in the several figures.

This invention relates to improvements in the construction of stoves for warming purposes; and has for its objects, first, the construction of an ash-pit with windows, which will expose to view the light from the products of combustion which are exposed between the fire-pot and the grate; and, second, in a stove provided with a magazine, and so constructed that air is admitted into the combustion-chamber above the grate, for the purpose of effecting a very perfect combustion of the smoke and gases.

The following description of my invention will enable others skilled in the art to understand one practical mode of carrying it into effect.

A represents the hearth-plate, on which stands the ash-pit B, having in its upper region a grate, G, above which is the fire-chamber E. Above this fire-chamber E is the magazine M, which is of less diameter than the fire-chamber, and is as deep as may be found convenient and desirable for containing a proper supply of coal without the necessity of frequently removing the same. The magazine M is closed tightly on top, so that no draft of air can enter it. The fire pot or chamber is less in diameter than the ash-pit, and from the top plate of the ash-pit, which extends beyond the fire-chamber, flues D D extend upward, and communicate above with an annular chamber, J, surrounding the magazine, from which chamber a flue or pipe, P, carries off the products of combustion into a chimney. The ring which forms the top part of the fire-chamber lying between its outer wall and that of the magazine is pierced with slots for the admission of air, and is covered by a circularly-movable ring or register, which is perforated at *a*, and designed for the management of drafts of air into the fire-chamber. The ash-pit is closed by a door, C, and the wall of this ash-pit, as well as the door thereof, is constructed with windows *b b*, composed of talc or other transparent glazing. These windows expose to view the light of the fire, and indicate at a glance its condition with closed doors. In other words, I have an illuminating-chamber through which the light of the fire between the coal-chamber and the grate is reflected. The construction above described is such that a space, R, is formed horizontally between the grate and the side of the fire-pot E, and by this means, in combination with the transparent windows *b b*, I secure a high degree of illumination in the ash-pit of the stove or heater.

When fire is kindled in the chamber E drafts of air enter at *a* and pass downward through the grate G into the ash-pit; thence up through the flues D into the chamber J, and through the pipe P into the chimney. The magazine M being filled with coal, and the top closed tight, the lower portion of the fuel presses down upon the burning mass in the fire-chamber and becomes warmed by contact with it. This heats the coal in the lower part of the magazine, and distills from it the sulphur, bitumen, and other inflammable products, which pass into the incandescent bed and are consumed. The coal in the lower part of the magazine is thus converted into coke on its way into the combustion-chamber. The draft of air being admitted at *a a*, the coal above the plane of these inlets does not ignite, but is simply heated and prepared for ignition, as above described.

I do not claim, broadly, the use of a fuel-magazine, nor of a downward draft for the fire, neither being novel arrangements in stoves.

Having thus described my invention, what I claim as new is—

1. The mica windows of the ash-pit, in combination with a space for illumination from the products of combustion between the wall of the fire-pot and the lateral edge of the grate.

2. The combination of the mica windows of the ash-pit with a grate which exposes the illumination from the products of combustion, both between the walls of the fire-pot and the lateral edge of the grate and beneath the grate.

3. In a base-burner having a downward draft into the ash-pit, through the grate, and between the grate and the lateral edge of the fire-pot, illuminating windows or doors in the wall of said ash-pit, substantially as described.

4. A stove or heater which is provided with a magazine for reserve coal, and constructed with openings for the admission of air to the fuel at some point or points above the grate, substantially as described.

5. The circularly-movable register-ring, applied at the upper part of the fire-chamber E, and at a point between the magazine and said chamber, for allowing a downward draft through said fire-chamber below the superincumbent unignited coal, and through the grate into the ash-pit, substantially as described.

6. The combination of a magazine, a fire-pot, a grate, and an ash-pit which has windows of mica or other transparent material in it, the combination being such that the ash-pit becomes illuminated, and such illumination is exposed through the windows, as specified.

JAMES EASTERLY.

Witnesses:
JOHN E. GALLUP,
JOHN A. TRACEY.